Patented Oct. 10, 1933

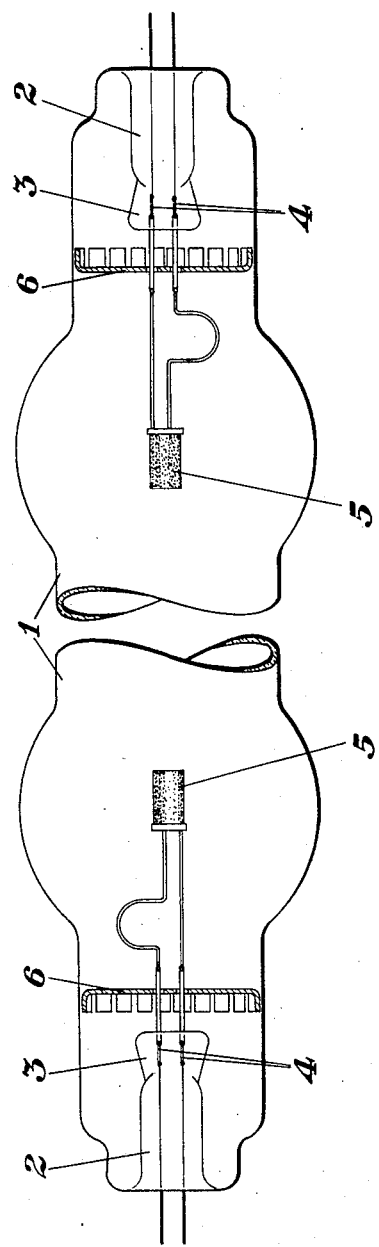

1,930,090

UNITED STATES PATENT OFFICE 1,930,090

GASEOUS ELECTRIC DISCHARGE DEVICE

Georg Gaidies, Berlin-Pankow, Germany, assignor to General Electric Company, a corporation of New York Application May 12, 1931, Serial No. 536,803, and in Germany July 9, 1930

6 Claims. (Cl. 176—122)

The present invention relates to gaseous electric discharge devices generally and more particularly the invention relates to such devices in which the gaseous filling consists wholly or in part of a metal vapor.

It is well known in the art that sodium and cadmium vapor are very efficient gaseous fillings for gaseous electric discharge devices, however, it is as equally well known in the art that gas fillings of such vapors are destructive of the glass walls of the container of the device when the container consists of the usual glasses such as lead glass, magnesium glass and other well known glasses. Glass for use in the container of gaseous electric discharge devices, the gaseous atmosphere of which consists wholly or in part of a sodium or cadmium metal vapor, has recently been invented, and such glass is described in co-pending applications Serial Number 510,222, filed January 22, 1931, being the invention of Marcello Pirani, Martin Reger and Georg Gaidies, and Serial Number 470,436, filed July 24, 1930, being the invention of Georg Gaidies and Marcello Pirani. The object of the present invention is to provide means whereby the stem of the electric discharge device having a container made of the special glass described in the co-pending applications hereinbefore referred to may be made of the usual sealing glasses, such as lead glass.

The invention attains its object by providing shields of heat resisting material, such as mica, to form a baffle between the electrodes and the stems of the gaseous electric discharge device, said shields fitting against or closely approaching the walls of the container of the device to prevent the metal vapor from entering that part of the container in the region of the stem. The glass making up the stem is thus protected from the destructive effects of the sodium or cadmium vapor and as a result it may consist of the usual sealing glasses well known in the art.

In the drawing accompanying and forming part of this specification an embodiment of the invention is shown for purposes of disclosure.

Referring to the drawing 1 is the container of the gaseous electric discharge device, and said container 1 consists of a glass chemically stable in the presence of sodium or cadmium vapor. Such glass is disclosed in the co-pending applications referred to above and contains a considerable percentage of boric acid and the usual glass constituents such as alkalies, alkali earths and aluminum oxide together with less than 50% of silicic acid. The boric acid part should always be not less than 30% of all the stock parts of the glass. Such glass is stable in the presence of sodium vapor. Glass containing besides the usual boric acid, alkalies and alkali earths at least 10% aluminum oxide and less than 60% silicic acid is stable in the presence of cadmium vapor. Glasses made in accordance with the above formulæ are easily workable, are highly heat resisting and a container made of such glass and filled with an alkali metal vapor does not become noticeably browned or blackened after 1000 hours of operation. The gaseous atmosphere of said electric discharge device consists of sodium or cadmium vapor and may contain in addition a starting gas. At each end of container 1 is a stem 2 consisting of lead glass, lead 4 of electrode 5 being fused in said stem 2 to form a vacuum tight seal. A mica shield 6 is placed between stem 2 and electrode 5, said shield 6 being maintained in position by the slotted rim parts thereof pressing against the inner walls of container 1 as shown in the drawing, or said shield 6 may be of lavite and the rim parts thereof may be fused into the walls of said container 1. That part of the container 1 in the region of the stem 2 is therefore, completely closed off from the rest of the container 1 by shield 6 and thus the lead glass stem 2 is protected from the destructive effects of the sodium or cadmium vapor.

While I have shown and described a particular embodiment of my invention it will be understood that many substitutions, modifications, and changes in the form and details of the device may be made by those skilled in the art without departure from the broad spirit and scope of the invention, for example shield 6 may consist of any suitable heat resisting material and the electrodes 5 may be heated electrodes as shown or cold electrodes may be used as desired.

What I claim as new and desire to secure by Letters Patent of the United States, is:

1. In an electric discharge device, a container having electrode supporting stems, electrodes sealed therein, a gaseous atmosphere therein, said container being of a glass resistant to the effects of the gaseous filling, the stems of said container being of a different glass and means interposed between said electrodes and said stems completely closing off the stem parts of said container for preventing the gas filling from attacking the stems of said container.

2. In an electric discharge device, a container having electrode supporting stems, electrodes sealed therein, a gaseous atmosphere of sodium vapor therein, said container being of a glass resistant to the effects of the gaseous filling, the stems of said container being of a different glass and means interposed between said electrodes and said stems completely closing off the stem parts of said container for preventing the sodium vapor gas filling from attacking the stems of said container.

3. In an electric discharge device, a container having electrode supporting stems, electrodes sealed therein, a gaseous atmosphere of cadmium vapor therein, said container being of a glass resistant to the effects of the gaseous filling, the stems of said container being of a different glass and means interposed between said electrodes and said stems completely closing off the stem parts of said container for preventing the cadmium vapor gas filling from attacking the stems of said container.

4. In an electric discharge device, a container having electrode supporting stems, electrodes sealed therein, a gaseous atmosphere therein, comprising a mixture of gas and a metal vapor, said container being of a glass resistant to the effects of the gaseous filling, the stems of said container being of a different glass and means interposed between said electrodes and said stems completely closing off the stem parts of said container for preventing the gas filling from attacking the stems of said container.

5. In an electric discharge device, a container having electrode supporting stems, electrodes sealed therein, a gaseous atmosphere therein, said container being of a glass resistant to the effects of the gaseous filling, the stems of said container being of a different glass and a baffle interposed between said electrodes and said stems completely closing off the stem parts of said container for preventing the gas filling from attacking the stems of said container.

6. In an electric discharge device, a container having electrode supporting stems, electrodes sealed therein, a gaseous atmosphere therein comprising an alkali metal vapor, said container being of a glass resistant to the effects of the gaseous filling, the stems of said container being of a different glass and a baffle interposed between said electrodes and said stems completely closing off the stem parts of said container to prevent the gas filling from attacking the stems of said container.

GEORG GAIDIES.